(12) United States Patent
Sherman et al.

(10) Patent No.: US 8,799,271 B2
(45) Date of Patent: Aug. 5, 2014

(54) RANGE PREDICATE CANONIZATION FOR TRANSLATING A QUERY

(75) Inventors: Yuval Sherman, Haifa (IL); Barry Lynn Fritchman, Lake Forest, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 83 days.

(21) Appl. No.: 13/012,868

(22) Filed: Jan. 25, 2011

(65) Prior Publication Data

US 2012/0191697 A1    Jul. 26, 2012

(51) Int. Cl.
*G06F 17/00* (2006.01)

(52) U.S. Cl.
USPC ........... 707/717; 707/713; 707/722; 707/736; 706/12; 706/14

(58) Field of Classification Search
None
See application file for complete search history.

(56) References Cited

U.S. PATENT DOCUMENTS

| | | | |
|---|---|---|---|
| 6,345,272 B1 * | 2/2002 | Witkowski et al. | 707/759 |
| 6,850,933 B2 * | 2/2005 | Larson et al. | 1/1 |
| 7,111,020 B1 * | 9/2006 | Gupta et al. | 1/1 |
| 7,379,933 B1 | 5/2008 | Witkowski et al. | |
| 7,383,256 B2 * | 6/2008 | Larson et al. | 1/1 |
| 7,406,469 B1 | 7/2008 | Thiyagarajan | |
| 7,440,963 B1 * | 10/2008 | Bello et al. | 1/1 |
| 7,558,780 B2 | 7/2009 | Shriraghav et al. | |
| 7,587,383 B2 * | 9/2009 | Koo et al. | 1/1 |
| 7,774,354 B2 | 8/2010 | Grundler et al. | |
| 7,840,553 B2 | 11/2010 | Lawande | |
| 7,844,600 B2 | 11/2010 | Hu et al. | |
| 2003/0093415 A1 * | 5/2003 | Larson et al. | 707/3 |
| 2003/0167258 A1 * | 9/2003 | Koo et al. | 707/2 |
| 2005/0091208 A1 * | 4/2005 | Larson et al. | 707/3 |
| 2007/0214107 A1 * | 9/2007 | Bello et al. | 707/2 |
| 2012/0047117 A1 * | 2/2012 | Nica | 707/702 |
| 2012/0117081 A1 * | 5/2012 | Das et al. | 707/747 |

OTHER PUBLICATIONS

Yuval Sherman and Taoufik Ben Abdellatif, "Best Practices for Using Materialized Views in HP Neoview Release 2.4", Jan. 2010, 1-22 pages.

HP Publication entitled HP Neoview Materialized Views Query Rewrite Guide (Controlled Availability), Published Jul. 2010, pp. 1-20.

Jonathan Goldstein and Per-Åke Larson, "Optimizing Queries Using Materialized Views: A Practical, Scalable Solution", May 2001, 12 pages.

* cited by examiner

*Primary Examiner* — Hung Le

(57) ABSTRACT

A system and methods for implementing a materialized view for a query are provided. The query system includes a database that includes a base table. The base table can include a set of data. The query system also includes a materialized view associated with a portion of the set of data, and a MVQR component to translate each of a range predicate of the materialized view and a range predicate of a query into a canonical range representation (CRR) format in materialized view metadata and query metadata, respectively, to enable the query to search the materialized view.

12 Claims, 3 Drawing Sheets

RANGE PREDICATE CANONIZATION FOR TRANSLATING A QUERY

BACKGROUND

Many businesses include large databases that include base tables of data that can be searched using queries. Due to the large volumes of data that can be included in the base tables, such queries can typically take relatively large amounts of time. A materialized view is a database object that can contain the results of a query, such that they can be established as local copies of data located remotely, or used to create summary tables based on aggregations of the data of a given one or more base tables. Materialized views thus allow reuse of the computation effort of a query, such that some complex queries can return results from a materialized view much more rapidly than from the corresponding base table.

DETAILED DESCRIPTION

Figure 1:
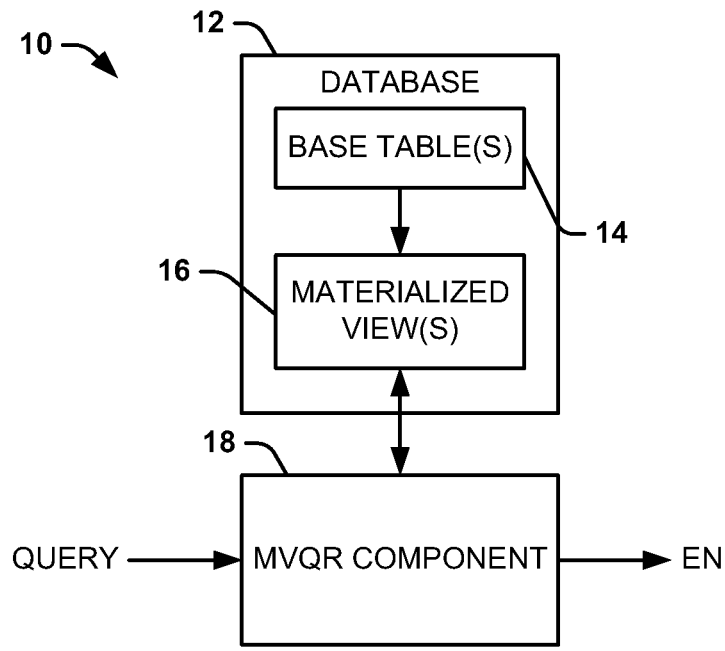
FIG. 1 illustrates an example of a query system.

FIG. 1 illustrates an example of a query system 10. The query system 10 can be implemented in a variety of computing environments, such as a business enterprise. The query system 10 includes a database 12. The database 12 can be included in any of a variety of types of memory structures and can be configured to store a large amount of searchable data. For example, the database 12 includes one or more base tables 14 that can be organized by rows and columns that include a set of data that forms at least a portion of the searchable data.

The set of data within the base table(s) 14 of the database 12 can be searched via a query. In the example of FIG. 1, the query is demonstrated as QUERY, which can represent one or more queries that are intended to search the base table(s) 14 of the database 12. As an example, the query can be programmed in Structured Query Language (SQL) and can specify the given base table(s) 14 that are intended to be searched, and may include one or more range predicates that indicate specific data values within the base table(s) 14 for which the query is intended to search. Thus, upon finding the specific data values within the base table(s) 14, such as in a given set of rows and/or columns specified by the range predicates, the query can thus provide the requested results.

As described herein, a range represents a subset of the allowable values of an ordered type, and can be expressed by combinations of predicates (i.e., range predicates) using fundamental comparison operators, such as equals (i.e., =), less-than (i.e., <), greater-than (i.e., >), less-than-or-equal (i.e., <=), greater-than-or equal (i.e., >=) and not equal (i.e., < >). It is to be understood that a range is not limited to a consecutive set of values. In addition, each range specified by a query can be composed of zero or more sub-ranges, each of which can represent one or more contiguous values. A range can also represent or include the pseudo-value NULL. If a range has zero sub-ranges, then the set of values it represents is the empty set, aside from the possibility of the NULL value.

One or more materialized views 16 can be created, such as in response to a "create materialized view" statement that is programmed in SQL. In the example of FIG. 1, the materialized view(s) 16 are demonstrated as stored in the database 12. It is to be understood that the database 12 can also include additional query system components that are not demonstrated in the example of FIG. 1. The materialized view(s) 16 can correspond to results of a query that is performed on the base table(s) 14, as indicated by metadata of the respective materialized view(s) 16. As a result, subsequent queries of the specific base table(s) 14 that are programmed to access the same or a subset of the rows and/or columns as represented by the materialized view(s) 16 can instead search the materialized view(s) 16. Thus, the search can save time and computing resources based on searching through a much smaller set of data in the materialized view(s) 16 than the voluminous data of the base table(s) 14, and based on the original query including possible complex operations such as JOIN and GROUP BY clauses that can require considerable computational effort. Accordingly, the search of the materialized view(s) 16 can be a much more efficient search than a search of the base table(s) 14.

The query system 10 also includes a materialized view query rewrite (MVQR) component 18. The MVQR component 18 can be configured as hardware or a combination of hardware and computer executable instructions. In the example of FIG. 1, the queries are demonstrated as being provided to the MVQR component 18. The MVQR component 18 can be configured as part of the database 12. For example, the MVQR component 18 can be part of a query optimizer (not shown). Thus, the MVQR component 18 can receive queries that are programmed to search the one or more base tables 14 of the database 12. As described above, subsequent queries of the specific base table(s) 14 that are programmed to access the same or a subset of the rows and/or columns as represented by the materialized view(s) 16 can instead search the materialized view(s) 16 to return the same data. Thus, to enable a search of the materialized view(s) 16 by the subsequent queries, the MVQR component 18 is configured to translate range predicates associated with both the query and the materialized view(s) 16 to metadata in a Canonical Range Representation (CRR) format. The metadata associated with the query and the materialized view(s) 16 can also include, as an example, information regarding specific base tables, join predicates, and/or other SQL clauses, along with CRR format of the range predicates.

The CRR can be a conjunctive normal form for representing both the range predicates of the queries and the materialized view(s) 16 as metadata. Thus, the CRR can be adapted by the MVQR component 18 to represent range expressions in a variety of data types and forms, such as programmed in SQL, including the NULL value. As an example, the CRR can represent a variety of equivalent expressions for a given range as a single range-oriented predicate. For instance, Table 1 demonstrates a plurality of equivalent manners of expressing a range of integer values between "5" and "9" in SQL:

TABLE 1

| |
|---|
| x = 5 OR x = 6 OR x = 7 OR x = 8 OR x = 9 |
| x IN (5, 6, 7, 8, 9) |
| x BETWEEN 6 AND 9 OR x = 5 |
| x <= 9 AND x >= 5 |
| x < 10 AND x > 4 |

The expressions demonstrated in Table 1 thus each individually demonstrate a plurality of separate range predicates that are connected via Boolean operators (i.e., "and" and "or"). Thus, the MVQR component 18 can be configured to convert each of the separate and equivalent expressions in Table 1 to the same form in the CRR, such as provided in the following expression:

$$x: \text{ExactNumeric } \{[5 \ldots 9]\} \qquad \text{Expression 1}$$

The translation of the range predicates of the queries and the materialized view(s) 16 can be performed by the MVQR component 18 in a manner that is transparent to a user. Therefore, the MVQR component 18 may not change the syntax of the query or the materialized view(s) 16. Thus, as an example, the user can program any of the range predicate expressions in Table 1 in a given query and receive results from a given materialized view 16 based on the given materialized view 16 using any of the range predicates on the column "x" in Table 1, or using any range predicate that subsumes any of the range predicates in Table 1. For example, for a materialized view 16 that uses any of the range predicates in Table 1, and for a query that uses any of the range predicates in Table 1 and matches the given materialized view 16 in all factors other than range predicates, then the MVQR component 18 can declare that the query and the given materialized view 16 are matched. This is because internally (i.e., with respect to the MVQR component 18), all the range predicates in Table 1, as well as any equivalent range predicates, are represented by Expression 1. The MVQR component 18 can also determine, in this example, that the query and the given materialized view 16 are matched if the query includes a range predicate that is subsumed by any of the range predicates in Table 1. Furthermore, the user can also program any of the range predicate expressions in Table 1 in a given query and receive results from the given materialized view 16 based on the given materialized view 16 having no range predicate on the column "x", which is equivalent to the given materialized view 16 having a range predicate that subsumes the entire data type.

The transparency of the use of the materialized view(s) 16 is thus such that the user need not be aware of the translation performed on either the query or the materialized view 16 by the MVQR component 18. In addition, the translations performed by the MVQR component 18 can support any of the SQL ordered data types. For instance, the query metadata and the materialized view metadata can include any of a variety of SQL data types, including Exact Numeric data types (i.e., integer, decimal, date, and time data types), Approximate Numeric data types (i.e., floating point numbers, including double precision floating points), and String data types (i.e., single-byte and multi-byte character text), which can each be represented differently in the CRR. Furthermore, the query metadata and the materialized view metadata can be generated to be applicable to any representations of data in a given materialized view 16, such as columns, rows, and/or any other data structure associated with an ordered data type.

The sub-ranges of a given range in the range predicates of the queries and/or the materialized view(s) 16 can be mutually exclusive in the CRR. Therefore, no individual value can be contained in more than one sub-range of the CRR, regardless of the form of the original predicates in the query and/or the materialized view(s) 16. Moreover, if the data type underlying the range is conducive to a determination that two values are consecutive, then two consecutive values will not be expressed in the CRR as belonging to separate sub-ranges. For example, a range predicate on an integer column "x" can be expressed as follows:

$$x \text{ IN } (1,2,3) \text{ OR } x \text{ BETWEEN 4 AND 6} \qquad \text{Expression 2}$$

Expression 2 thus represents a disjunctive range predicate that establishes that "x" can be equal to "1", "2", or "3", or can occupy the sub-range 4 through 6. Thus, because the set of integers 1, 2, and 3 are consecutive with each other and consecutive with the sub-range 4 through 6, the MVQR component can merge Expression 2 into a single range predicate, such as follows:

$$x: \text{ExactNumeric } \{[1 \ldots 6]\} \qquad \text{Expression 3}$$

The merging of sub-ranges of SQL expressions in the CRR by the MVQR component 18 can likewise be performed on SQL predicates that specify one or more redundant values (i.e., included in more than one sub-range) within a given range or sub-range in the SQL expression.

Furthermore, translated expressions in the CRR may not be limited to explicit range predicates in the query or the materialized view(s) 16, and thus may include implicit predicates such as check constraints and/or data types that may further restrict a possible set of values in a given column of the materialized view(s) 16 or query. For instance, the implicit predicates can further restrict a possible set of values stored in a respective column beyond the restrictions of an explicit range predicate. As an example, range predicates in queries and in materialized view(s) 16 that specify values that exceed allowable data ranges for the given data type can be incorporated into the CRR metadata for the respective range predicate. Thus, the CRR can allow only values that are not restricted by either a range predicate or a data type constraint. As another example, a check constraint on a given set of values in a given query or materialized view 16, such as to only specify positive integers or to disallow NULL values, can likewise be incorporated into the CRR metadata for the respective range predicates of the materialized view 16.

As described above, such translation of SQL can occur for the range predicates in the queries and the materialized view(s) 16. Therefore, a query optimizer (not shown) or other component can be configured to determine if a given query matches one or more of the materialized view(s) 16, such that the matched one or more of the materialized view(s) 16 are determined to be candidates for searching for the data required by the query. As described herein, a given query is said to match a given materialized view if the metadata of the given query is subsumed by the metadata of the given materialized view. For example, the given materialized view can subsume the given query with respect to the CRR format of the range predicates, as well as additional information in the respective metadata, such as information regarding specific base tables, join predicates, and/or other SQL clauses, to determine that the given query and the given materialized view match.

Therefore, upon translating the range predicates of a given query to generate query metadata, and upon translating the range predicates of a given materialized view 16 to generate materialized view metadata, the MVQR component 18 can thus compare the query metadata and the materialized view metadata to determine if there is a match. Upon determining a match, the MVQR component 18 can enable the query to use the respective materialized view 16 instead of the base table(s) 14, such as by rewriting the query. In the example of FIG. 1, the enabling of the use of the materialized view 16 by the query is demonstrated as the MVQR component 18 generating a signal EN.

Figure 2:
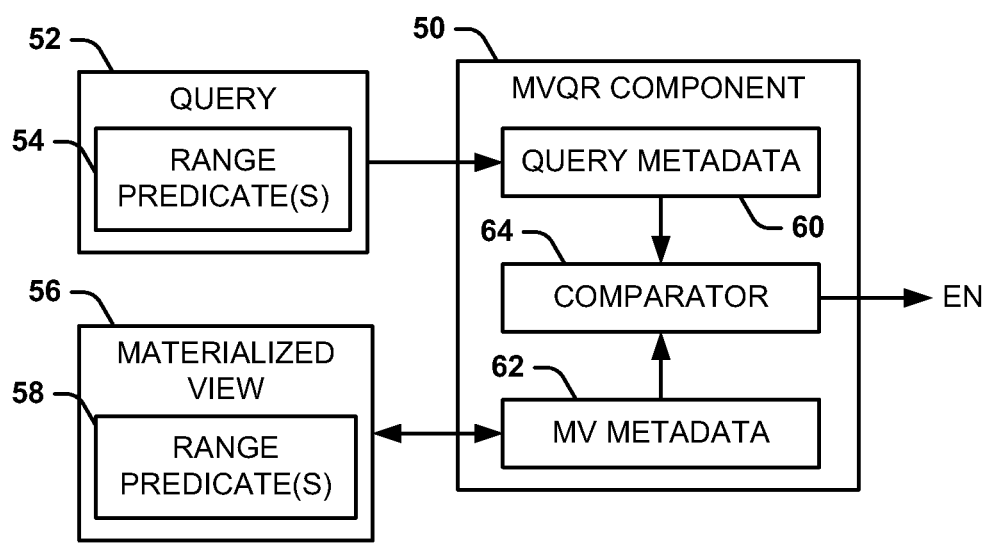
FIG. 2 illustrates an example of a materialized view query rewrite (MVQR) component.

FIG. 2 illustrates an example of a materialized view query rewrite (MVQR) component 50. The MVQR component 50 can be configured as computer executable instructions. The MVQR component 50 can correspond to the MVQR component 18 in the example of FIG. 1. Thus, reference is to be made to the example of FIG. 1 in the following description of the example of FIG. 2.

The MVQR component 50 is demonstrated as receiving a query 52 that includes one or more range predicates 54. Similarly, the MVQR component 50 can access a materialized view 56 that includes at least one range predicate 58. The MVQR component 50 is thus configured to generate a set of query metadata 60 based on the range predicate(s) 54 of the query 52 and to generate a set of materialized view metadata 62, demonstrated in the example of FIG. 2 as "MV METADATA" based on the range predicate(s) 58 of the materialized view 56. As an example, the materialized view metadata 62 can be generated when the materialized view 56 is initially generated, or can be generated the first time or each time the MVQR component 50 receives a query. In addition, although the materialized view metadata 62 is demonstrated as being stored in the MVQR component 50, it is to be understood that the materialized view metadata 62 can instead be stored in System MetaData (SMD) tables, or in any other way that system metadata information can be stored. The query metadata 60 and the materialized view metadata 62 can each include range predicates of the query 52 and materialized view 56, respectively, that are represented in CRR format.

The MVQR component 50 thus compares the query metadata 60 and the materialized view metadata 62 via a comparator 64. The comparator 64 can thus determine if the materialized view metadata 62 subsumes the query metadata 60. As an example, assuming that an integer column "fmonth" in a table "fact" can store the numbers "1" to "12" to represent the months January through December, respectively, the following expression shows the CRR representation of the materialized view range predicate to demonstrate that the materialized view 56 may include data associated with the months January through August, or data not associated with any month:

fact.fmonth: ExactNumeric {[1 . . . 8,NULL]}     Expression 4

The following expression can thus correspond to the query metadata 60 to demonstrate that the query 52 requests data associated with the months March through July:

fact.fmonth: ExactNumeric {[3 . . . 7]}     Expression 5

Thus, because Expression 5 includes a range of months that is a subset of the months included in Expression 4, then the CRR of the range predicates in the materialized view metadata 62 subsumes the CRR of the range predicates in the query metadata 60. Upon other possible characteristics of the query metadata 60 and the materialized view metadata 62 matching, the comparator 64 can therefore determine that the materialized view 56 subsumes the query 52, such that the query 52 matches the materialized view 56 and can search the materialized view 56 without the possibility of requiring data that is not included in the materialized view 56. Accordingly, the comparator 64 generates the signal EN to enable the query 52 to search the materialized view 56.

Figure 3:
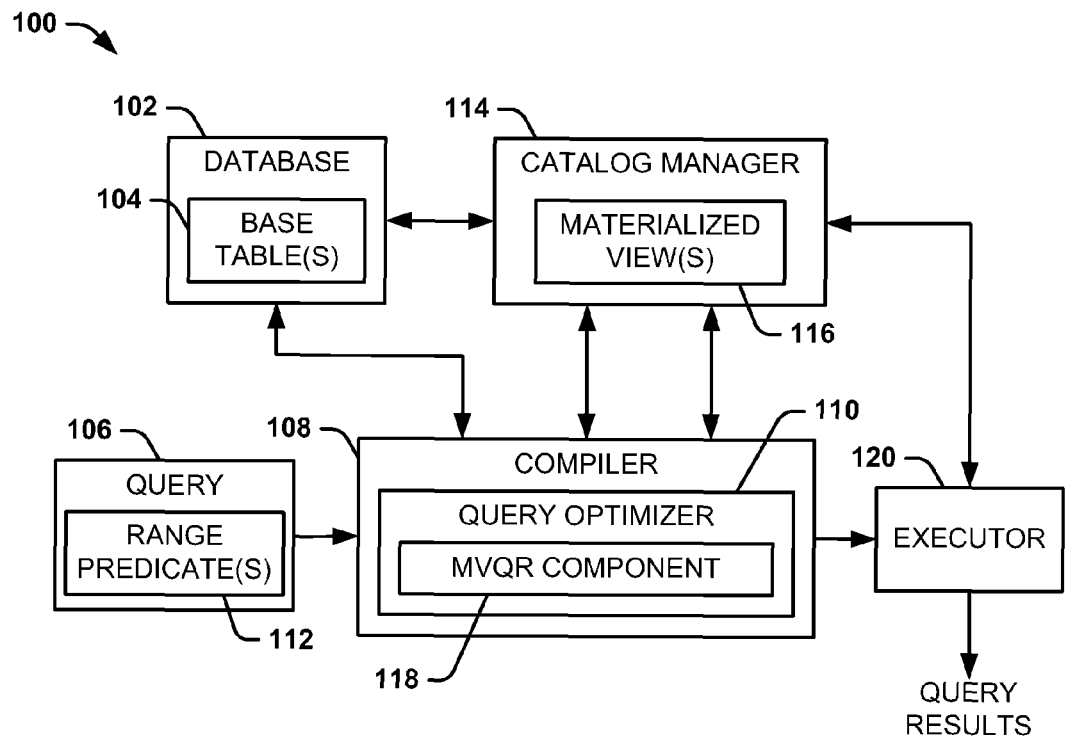
FIG. 3 illustrates another example of a query system.

FIG. 3 illustrates another example of a query system 100. The query system 100 can be implemented in a variety of computing environments, such as a business enterprise or network. The query system 100 includes a database 102. The database 102 can be included in any of a variety of types of memory structures and can be configured to store a large amount of searchable data. For instance, the database 102 includes one or more base tables 104 that can be organized by rows and columns that include a set of data that forms at least a portion of the searchable data.

The set of data within the base table(s) 104 of the database 102 can be searched via one or more queries. In the example of FIG. 3, a query 106 is provided to a compiler 108. As an example, the compiler 108 can be an SQL compiler. In the example of FIG. 3, the compiler 108 includes a query optimizer 110. The query 106 can represent one or more queries that are intended to search the base table(s) 104 of the database 102. As an example, the query 106 can be programmed in SQL and may include one or more range predicate(s) 112 that indicate specific data values within the base table(s) 104 for which the query 106 is intended to search. The query optimizer 110 is configured to choose from among a number of possible search plans for searching the base table(s) 104 for the data that is requested by the query 106 in an efficient manner. The query system 100 also includes a catalog manager 114. In response to a "create materialized view" statement that is programmed in SQL, the catalog manager 114 can generate one or more materialized views 116. For instance, the catalog manager 114 can be configured to parse and store the internal details of the materialized view(s) 116.

In the example of FIG. 3, the query optimizer 110 includes an MVQR component 118. The MVQR component 118 can be configured substantially similar to the MVQR components 18 and 50 in the examples of FIGS. 1 and 2, respectively. Thus, the MVQR component 118 can receive the query 106 that is programmed to search the one or more base tables 104 of the database 102 for data specified by the range predicate(s) 112. For instance, the MVQR component 118 can be configured to translate the range predicate(s) 112 associated with the query 106 and range predicate(s) associated with the materialized view(s) 116 to metadata in CRR format. The MVQR component 118 can then compare the metadata associated with the range predicate(s) 112 of the query 106 and the metadata associated with the range predicate(s) of the materialized view(s) 116 to determine if the query 106 matches the materialized view(s) 116. Therefore, upon determining a match, the MVQR component 118 can enable the query optimizer 110 to include the materialized view(s) 116 as a potential search plan for searching for the specific data requested by the range predicate(s) 112 of the query 106. The MVQR component 118 can also provide instructions to the query optimizer 110 as to how to enable the query 106 to use the materialized view(s) 116. Therefore, in response to the MVQR component 118 determining that metadata of the query 106 is completely subsumed by the metadata of the materialized view(s) 116, the query optimizer 110 can select a search of the materialized view(s) 116 by the query 106 as an efficient search plan for accessing the data requested by the range predicate(s) 112.

Upon selecting a search plan for the query 106, the compiler 108 selects an execution plan for accessing the specified data. The execution plan is then provided to an executor 120 that is configured to execute the selected plan to retrieve the data requested by the query 106 from the materialized view(s) 116. The executor 120 can then provide the data specified by the query 106, demonstrated in the example of FIG. 3 as QUERY RESULTS.

It is to be understood that the query system 100 is not intended to be limited to the example of FIG. 3. As an example, it is to be understood that one or more of the components of the query system 100 can be configured as computer executable instructions or a combination of hardware and computer executable instructions, such that the functionality of at least some of the components of the query system 100 can be combined in one or more integrated circuits (ICs). As another example, the described functionality of the components of the query system 100 is provided as but one example, such that the query system 100 can include additional components and/or additional functionality or other functional interactions between components. Therefore, the query system 100 can be configured in any of a variety of different ways.

Figure 4:
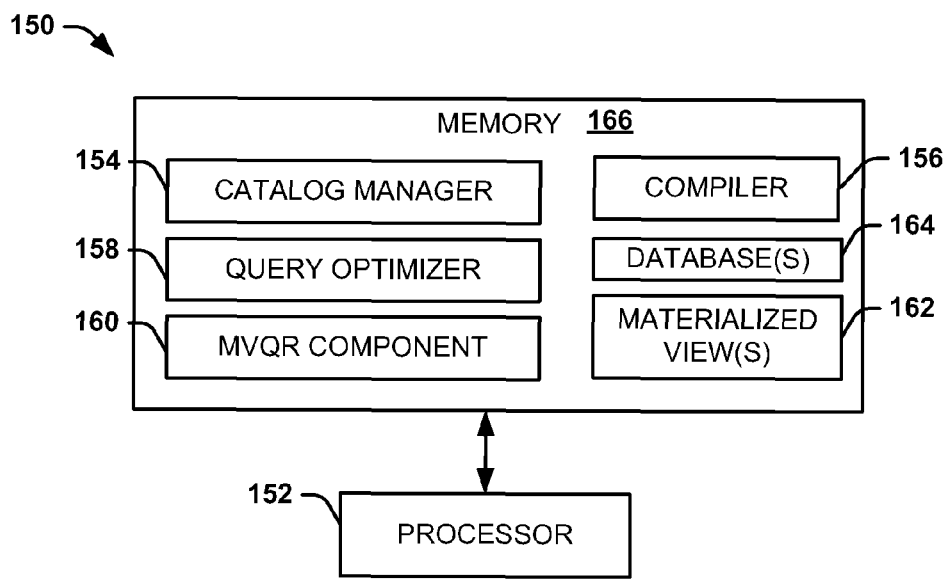
FIG. 4 illustrates an example of system that can be implemented as a computer readable medium.

FIG. 4 illustrates an example of a system 150 that can be implemented as a non-transitory computer readable medium that can include computer readable instructions. The system 150 can include a processor 152 configured to access memory 166 and execute instructions. For instance, the memory 166 can comprise physical memory, such as can reside on the processor 152 (e.g., processor memory), random access memory or other physical storage media (e.g., a CD ROM, DVD, flash memory, hard disk drive, etc. that can store the computer readable instructions.

In the example of FIG. 4, the computer readable instructions include a catalog manager 154, a compiler 156, a query optimizer 158, and an MVQR component 160. The catalog manager 154, the compiler 156, the query optimizer 158, and the MVQR component 160 can be configured substantially similarly to the catalog manager 114, the compiler 108, the query optimizer 110, and the MVQR component 118, respectively, in the example of FIG. 3. The catalog manager 154, the compiler 156, the query optimizer 158, and the MVQR component 160 can be accessed from the memory and executed by the processor 152.

As an example, the catalog manager 154 can be configured to create one or more materialized views 162 associated with a portion of a set of data represented by base tables in one or more databases 164. The materialized view(s) 162 and the database(s) 164 are demonstrated in the example of FIG. 4 as being stored in the memory 166. The memory can be implemented as part of the same or different computer from where the processor resides. The compiler 156 can receive queries programmed to search one or more base tables in the one or more databases 164 and can select an execution plan for accessing the data specified in the queries.

The query optimizer 158 can be programmed to choose from among a number of possible search plans for searching the base tables for the data that is requested by the queries in an efficient manner. The MVQR component 160 can be programmed to translate a range predicate of the materialized view(s) 162 into a canonical range representation (CRR) format in materialized view metadata, to translate a range predicate of a query into a CRR format in query metadata, to compare the materialized view metadata and the query metadata, and to enable a search of the materialized view(s) 162 by the query if the query metadata is subsumed by the materialized view metadata.

Figure 5:
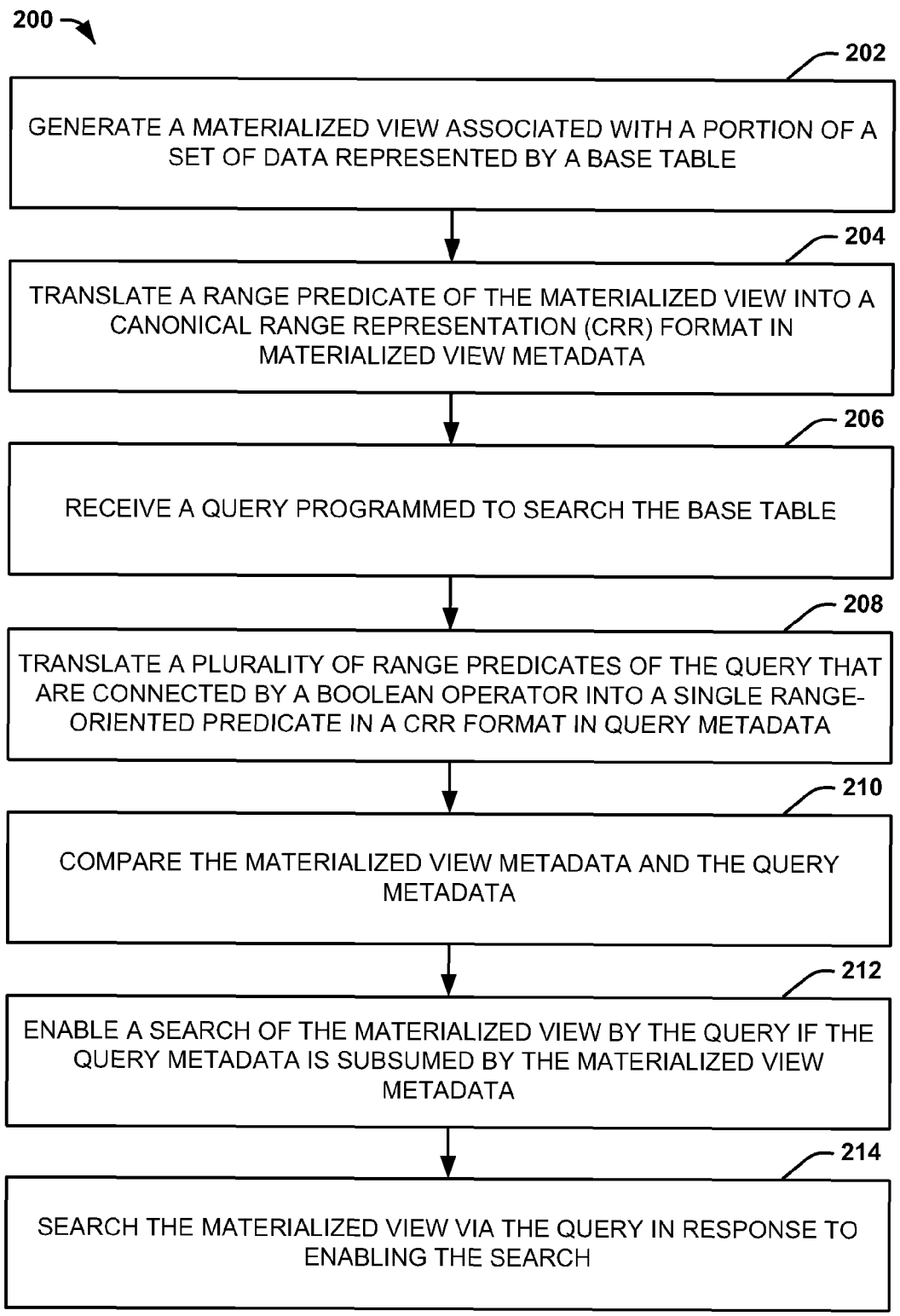
FIG. 5 illustrates an example of a method for translating a query to use a materialized view.

In view of the foregoing structural and functional features described above, an example method will be better appreciated with reference to FIG. 5. While, for purposes of simplicity of explanation, the method of FIG. 5 is shown and described as executing serially, it is to be understood and appreciated that the method is not limited by the illustrated order, as parts of the method could occur in different orders and/or concurrently from that shown and described herein.

FIG. 5 illustrates an example of a method 200 for translating a query to use a materialized view. At 202, a materialized view associated with a portion of a set of data represented by a base table is created. At 204, a range predicate of the materialized view is translated into a canonical range representation (CRR) format in materialized view metadata. At 206, a query programmed to search the base table is received. At 208, a plurality of range predicates of the query that are connected by a Boolean operator are translated into a single range-oriented predicate in a CRR format in query metadata. At 210, the materialized view metadata and the query metadata are compared. At 212, a search of the materialized view by the query is enabled in response to the query metadata being subsumed by the materialized view metadata. At 214, the materialized view is searched via the query in response to enabling the search.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A query system comprising:
a database comprising a base table, the base table comprising a set of data arranged in a plurality of columns;
a materialized view associated with a portion of the set of data;
a materialized view query rewrite (MVQR) component to translate each of a range predicate of the materialized view for a given column of the base table and a range predicate of a query into a canonical range representation (CRR) format to generate a materialized view metadata for the given column and a query metadata, respectively, and to compare the materialized view metadata and the query metadata to determine whether the query matches the materialized view to enable the query to search the materialized view, the MVQR component being further to merge a first range associated with a first range predicate and a second range associated with a second range predicate into a third range corresponding to a single range predicate in the CRR format and comprising both the first range and the second range, the first and second range predicates being associated with at least one of the query and the materialized view and the first and second ranges comprising one of overlapping and adjacent values with respect to each other; and
a query optimizer to choose from among a plurality of possible search plans for searching the base table for data associated with the range predicate of the query, the materialized view being included in the plurality of possible search plans by the query optimizer.

2. The system of claim 1, wherein the MVQR component is further to enable search of the materialized view by the query in response to determining that the query is subsumed by the materialized view based on the materialized view metadata and the query metadata.

3. The system of claim 1, wherein the MVQR component is further to translate a data type associated with at least one of the query and the materialized view into CRR format.

4. The system of claim 1, wherein the MVQR component is further to translate a plurality of range predicates associated with at least one of the query and the materialized view that are connected by a Boolean operator to the single range predicate in CRR format.

5. The system of claim 4, wherein the plurality of range predicates associated with at least one of the query and the materialized view comprises a NULL value.

6. A non-transitory computer readable medium having computer readable instructions comprising:

a catalogue manager to create a materialized view associated with a portion of a set of data represented by a base table;

a compiler to receive a query programmed to search the base table; and an MVQR component to translate a range predicate of the materialized view into a canonical range representation (CRR) format in materialized view metadata, to translate a range predicate of the query into a CRR format in query metadata, to compare the materialized view metadata and the query metadata, and to enable a search of the materialized view by the query if the query metadata is subsumed by the materialized view metadata, the MVQR component being further to merge a first range associated with a first range predicate and a second range associated with a second range predicate into a third range corresponding to a single range predicate in the CRR format and comprising both the first range and the second range, the first and second range predicates being associated with at least one of the query and the materialized view and the first and second ranges comprising one of overlapping and adjacent values with respect to each other; and a query optimizer to select a search plan from among a plurality of possible search plans for searching the base table for data associated with the range predicate of the query, the materialized view being included in the plurality of possible search plans by the query optimizer.

7. The computer readable medium of claim 6, wherein the MVQR component is further to translate a plurality of range predicates associated with at least one of the query and the materialized view that are connected by a Boolean operator to a single range predicate in CRR format.

8. The computer readable medium of claim 6, wherein the MVQR component is further to translate associated with at least one of the query and the materialized view into CRR format.

9. The computer readable medium of claim 6, wherein the MVQR component is to translate the range predicate of the materialized view for a given column of the base table and to translate the range predicate of the query into the CRR format into the materialized view metadata for the given column of the base table and the range predicate of the query, respectively, into the CRR format.

10. A method comprising:

generating a materialized view associated with a portion of a set of data represented by a base table;

translating a range predicate of the materialized view into a canonical range representation (CRR) format in materialized view metadata;

receiving a query programmed to search the base table;

selecting from among a plurality of possible search plans that includes the materialized view via a query optimizer for searching the base table for data associated with the range predicate of the query;

translating a plurality of range predicates of the query that are connected by a Boolean operator into a single range-oriented predicate in a CRR format in query metadata, wherein translating at least one of the range predicate of the materialized view and the plurality of range predicates of the query comprises translating a data type associated with the materialized view into CRR format;

merging a first range associated with a first of the plurality of range predicates and a second range associated with a second of the plurality of range predicates into a third range corresponding to a single range predicate in the CRR format and comprising both the first range and the second range, the first and second of the plurality of range predicates being associated with at least one of the query and the materialized view and the first and second ranges comprising one of overlapping and adjacent values with respect to each other;

comparing the materialized view metadata and the query metadata;

enabling a search of the materialized view by the query if the query metadata is subsumed by the materialized view metadata; and searching the materialized view via the query in response to the materialized view being selected as a most efficient one of the plurality of possible search plans by the query optimizer and in response to enabling the search.

11. The method of claim 10, wherein translating the plurality of range predicates of the query comprises translating a first range and a second range comprising one of overlapping and adjacent values with respect to each other into a third range in CRR format, the third range comprising both the first range and the second range.

12. The method of claim 10, wherein translating the range predicate associated with the materialized view comprises translating the range predicate associated with the materialized view for a given column of the base table into the materialized view metadata for the given column of the base table.

* * * * *

UNITED STATES PATENT AND TRADEMARK OFFICE
CERTIFICATE OF CORRECTION

PATENT NO.       : 8,799,271 B2                                    Page 1 of 1
APPLICATION NO.  : 13/012868
DATED            : August 5, 2014
INVENTOR(S)      : Yuval Sherman et al.

It is certified that error appears in the above-identified patent and that said Letters Patent is hereby corrected as shown below:

In the Claims

In column 9, line 35, in Claim 8, delete "translate" and insert -- translate a data type --, therefor.

Signed and Sealed this
Fifteenth Day of September, 2015

Michelle K. Lee
*Director of the United States Patent and Trademark Office*